United States Patent Office 2,759,876
Patented Aug. 21, 1956

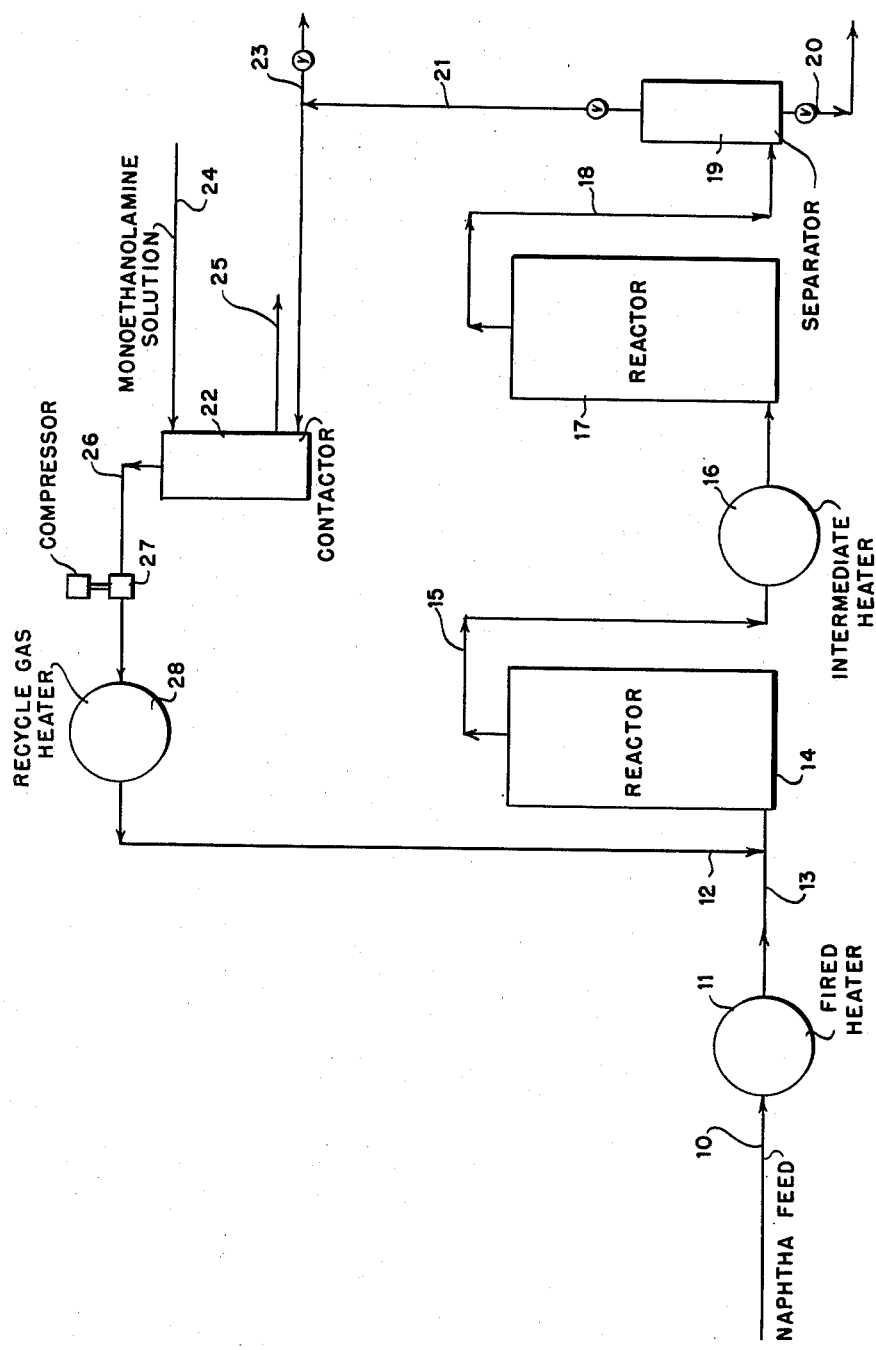

2,759,876

HYDROCARBON CONVERSION PROCESS

John W. Teter and Robert H. Elkins, Chicago, Ill., assignors to Sinclair Refining Company, New York, N. Y., a corporation of Maine Application September 1, 1951, Serial No. 244,844

3 Claims. (Cl. 196—50)

Our invention relates to improvements in the reforming of light hydrocarbon or naphtha fractions in the presence of hydrogen and an acidic promoted reforming catalyst. Our invention is based upon our discovery that carbon dioxide appears to poison selectively acidic promoted reforming catalysts, such as fluoride promoted platinum on alumina with a resulting significant suppression of isomerization and hydrocracking.

In accordance with our invention, the hydrogen rich tail gas stream conventionally recycled to the catalytic reforming reaction is treated with an agent effective to remove small amounts of carbon dioxide. Thus in a typical catalytic reforming operation the naphtha or light hydrocarbon fraction constituting the feed is preheated and is admixed with the hydrogen rich recycle gas. The hydrogen rich recycle gas also is preheated so that the mixture is charged to a reaction zone containing the reforming catalyst at a temperature within the range of about 850 to 1000° F. Because of the endothermic nature of the overall reforming reaction, it is usually desirable to provide a plurality of reaction zones with intermediate reheating of the reaction mixture. The reaction vapors are cooled and separated into a liquid fraction and recycle tail gas fraction. The recycle tail gas fraction according to our invention is contacted with an agent such as alkanol amine which selectively removes carbon dioxide from the tail gas; and the treated tail gas is returned to the reaction zone through a compressor and recycle gas heater. The liquid products are fractionated in the usual manner to recover the reformate product for gasoline blending or aromatics concentration.

As noted above, the temperature is maintained in the range of about 850° to 1000° F. The operating pressure is maintained in the range of about 250 to 1000 p. s. i. g. Liquid hourly space velocities of from about 2 to 8 and ratios of hydrogen to hydrocarbon of from about 5/1 to 10 or 12/1 are usually maintained. Platinum-containing alumina or alumina-silica catalysts which have been promoted by addition of a fluoride or chloride have been found to be valuable in reforming operations. These catalysts ordinarily comprise about 0.2 to 1.0 weight per cent platinum and about 0.5 to 3.0 weight per cent halide on an alumina gel or alumina-silica gel base. The catalysts may be made by incorporating the halide in the form of an aqueous solution of a soluble salt in the base which is advantageously handled in hydrogel form as an aqueous slurry. The platinum may be incorporated by mixing a platinum sulfide sol with the hydrogel or by adding the platinum in the form of chlorplatinic acid. The hydrogel is dried, calcined and usually finished by heating to a temperature of up to 1000° to 1100° F. in the presence of hydrogen.

In test operations with fluoride promoted platinum-alumina catalysts, we have found that small amounts of carbon dioxide have a marked and deleterious effect on the activity of the catalyst. As shown by the following exemplary runs under the designated conditions, the presence of small quantities of carbon dioxide in the hydrogen stream resulted in a drop of about 4 octane numbers. The illustrative test results also demonstrate our finding that the effect of the carbon dioxide is temporary since the octane level returned to normal after elimination of the carbon dioxide and purging of the reaction zone for about 12 hours with hydrogen. The test data follow:

*Table*

| Run No.[1] | 1 | 2 | 3 | 4 |
|---|---|---|---|---|
| Hydrocarbon Feed | Blend of n-hexane, methyl cylopentane and cyclohexane | | | |
| Rate, cc./hr | 104 | 113 | 103 | 101 |
| LHSV | 4.15 | 4.52 | 4.13 | 4.04 |
| Carbon Dioxide, mol percent of hydrocarbon | | 1.7 | 4.1 | |
| $H_2$/Hydrocarbon mol ratio | 4.94 | 4.69 | 5.1 | 4.94 |
| Catalyst | 0.69% fluorine and 0.3% platinum on alumina | | | |
| Catalyst Volume, cc | 25 | 25 | 25 | 25 |
| Temperature, °F | 905 | 905 | 905 | 905 |
| Pressure, p. s. i. g | 750 | 750 | 750 | 750 |
| Process period, hours | 4½ | 4½ | 4½ | 4½ |
| Octane No. Research, Micro | 76.8 | 73.6 | 72.6 | 77.1 |

[1] Each run followed by hydrogen purge.

Further investigation of the effect of carbon dioxide on the reforming catalyst indicated that the various isomerization reactions were cheifly affected. Hydrocracking also was suppressed, while dehydrogenation was virtually unaffected. Although we are not able to explain the effect of the carbon dioxide on the catalyst, it is known that the activity of the fluoride promoted alumina catalyst depends on its acidic properties. The mechanism of the poisoning probably involves partial neutralization of the acidic centers by formation of an acid-base complex with the carbon dioxide, or more probably with water, which we believe may be the ultimate product and deleterious agent derived from carbon dioxide first appearing in the reaction vapors. It is suprising however that isomerization and cracking are not suppressed to a similar degree, but this may be explained by the fact that the platinum on the catalyst as well as the acidic promoter assists in catalyzing the hydrocracking reaction, whereas, all the isomerization occurs by action of the acidic alumina. These considerations tend to confirm our view that carbon dioxide or water as its conversion product act as harmful poisons for various acidic promoted gel type reforming catalysts without limitation to the presence of platinum.

The application of our invention will be illustrated in one form by reference to the accompanying drawing which represents a simplified flow plan of the reforming process.

In the drawing, naphtha fed through line 10 is charged to fired heater 11. Preheated recycle gas from line 12 is mixed with the preheated feed in line 13 and the mixture is charged to reactor 14. The catalyst is disposed in bed form in the reactor. The reaction vapors are withdrawn from reactor 14 through line 15 and are passed through intermediate heater 16 before admission to the second reaction chamber 17. The reaction vapors from reactor 17 are passed through line 18 to separator 19 from which a liquid product fraction is removed by means of connection 20. Tail gas for recycle is withdrawn from separator 19 through line 21 and is admitted to the foot of contactor 22. Excess tail gas may be purged from the system through connection 23. In contactor 22, the tail gas is contacted in the usual way with mono-ethanol amine or other suitable scrubbing agent in order to selectively absorb and remove carbon dioxide. The mono-ethanol amine solution is charged through connection 24 and the carbon dioxide containing solution is withdrawn through connection 25. The solution is revivified in the usual way by heating in a separate tower (not shown). Water under pressure or aqueous alkali solutions may be used to scrub the tail gas but care must be taken to dry the gas since it is our belief that moisture also is harmful to the catalyst. The treated tail gas is returned to the reaction zone through line 26, compressor system 27, recycle gas heater 28 and line 12.

We claim:

1. In a process for reforming a light hydrocarbon fraction wherein a hydrogen-rich tail gas from the reforming reaction zone is recycled thereto, and said fraction is contacted in said reaction zone, at a temperature of from about 850° to 1000° F., a pressure of from about 250 to about 1000 p. s. i., in the presence of from about 5 to about 12 mols of hydrogen per mol of hydrocarbon, with an acidic-promoted gel-type reforming catalyst, the improvement which comprises treating the tail gas with an agent effective to remove carbon dioxide therefrom prior to returning said tail gas to said reaction zone.

2. The process of claim 1 in which the light hydrocarbon fraction is contacted with an acidic-promoted alumina base reforming catalyst.

3. The process of claim 1 in which the light aromatic hydrocarbon fraction is contacted with a fluoride-promoted platinum-on-alumina reforming catalyst.

References Cited in the file of this patent

UNITED STATES PATENTS

| 2,304,183 | Layng et al. | Dec. 8, 1942 |
| 2,411,726 | Holroyd et al. | Nov. 26, 1946 |
| 2,479,110 | Haensel | Aug. 16, 1949 |

OTHER REFERENCES

Shreve: "Chemical Process Industries," McGraw-Hill Book Co., New York (1945), page 123.